(12) United States Patent
Wehner

(10) Patent No.: US 9,110,477 B2
(45) Date of Patent: Aug. 18, 2015

(54) OVER-TEMPERATURE PROTECTION FOR FLOWING FLUID SYSTEMS

(76) Inventor: Thomas Richard Wehner, Sante Fe, NM (US)

( * ) Notice: Subject to any disclaimer, the term of this patent is extended or adjusted under 35 U.S.C. 154(b) by 471 days.

(21) Appl. No.: 13/556,172

(22) Filed: Jul. 23, 2012

(65) Prior Publication Data
US 2014/0020676 A1   Jan. 23, 2014

(51) Int. Cl.
| F24J 2/24 | (2006.01) |
| G05D 23/13 | (2006.01) |
| F24J 2/46 | (2006.01) |
| F28D 21/00 | (2006.01) |

(52) U.S. Cl.
CPC ........... *G05D 23/1346* (2013.01); *F24J 2/4625* (2013.01); *F28D 2021/0029* (2013.01)

(58) Field of Classification Search
CPC ............ F24J 2/24; F24J 2/4625; Y02E 10/44; G05D 23/1306; G05D 23/1346; G05D 23/134; G05D 23/1353; F28F 27/02; F28D 2021/0029
See application file for complete search history.

(56) References Cited

U.S. PATENT DOCUMENTS

| 2,915,298 | A | * | 12/1959 | Hamlin et al. ................ 165/221 |
| 4,102,325 | A | | 7/1978 | Cummings |
| 7,823,582 | B2 | | 11/2010 | Harrison |
| 7,913,684 | B2 | | 3/2011 | Butler |
| 8,220,453 | B2 | | 7/2012 | Bourke |
| 8,459,248 | B2 | | 6/2013 | Milder |
| 8,726,898 | B2 | | 5/2014 | Torrens Rasal |
| 2010/0000710 | A1 | * | 1/2010 | Henke et al. .................... 165/58 |
| 2010/0059047 | A1 | | 3/2010 | Bourke |
| 2010/0126598 | A1 | * | 5/2010 | Peric et al. .................... 137/468 |
| 2010/2126598 | | | 5/2010 | Peric |
| 2011/0232862 | A1 | * | 9/2011 | Gofton ........................... 165/64 |

FOREIGN PATENT DOCUMENTS

GB            840218       *   7/1960

* cited by examiner

*Primary Examiner* — Alfred Basichas

(57) ABSTRACT

The present invention keeps fluid temperature at a point in a flowing fluid system below a preset limit by providing automatic self-adjusting over-temperature protection that cools the fluid when needed and without requiring a separate cold fluid source. The present invention keeps the temperature of the fluid at a point in the system clipped at a cutoff temperature and prevents overcooling the fluid. When the fluid temperature is below the cutoff temperature, the temperature of the fluid is unchanged as it passes through the apparatus of the present invention. The present invention can operate without electrical power or any power source, can function in any orientation, and works for both unpressurized and pressurized systems. The present invention has application in the areas of solar thermal energy systems, fluid storage tanks, engine oil and coolant systems, transmission oil systems, hydraulic systems, and cutting oil systems, among others.

13 Claims, 8 Drawing Sheets

OVER-TEMPERATURE PROTECTION FOR FLOWING FLUID SYSTEMS

STATEMENT REGARDING FEDERALLY SPONSORED R & D

No federally sponsored R & D, nor any federal funding was used in the R & D for the present invention.

STATEMENT OF PARTIES TO A JOINT RESEARCH AGREEMENT

The R & D for the present invention was not part of any joint research agreement.

CROSS REFERENCE TO RELATED APPLICATIONS

This application is a new application, and is not a continuation, a continuation in part, nor a division, of a previous application. This application does not claim priority on a previous patent application.

BACKGROUND OF THE INVENTION

1. Field of the Invention

The present invention relates to flowing fluid systems, both closed and open systems, in which the present invention prevents the fluid temperature from exceeding a predetermined set temperature at a point in the system, by cooling the flow in a controlled manner when required, to bring the fluid temperature down to the predetermined set-point temperature. Thus, overcooling is prevented. The present invention makes use of a thermostatic mixing valve in a completely new way to achieve this. One of the applications of the present invention is in the area of renewable energy, specifically solar thermal systems for water heating and space heating. Other applications include, but are not limited to, control of engine oil and coolant temperature, of transmission oil temperature, of hydraulic fluid temperature, of cutting oil temperature, and of storage tank fluid temperature.

2. Description of the Prior Art

Many solar thermal heating applications in non-drain-back systems suffer from overheating problems, including the loss-of-load problem and the over-supply problem. Both involve a mismatch in which the heat supply from the solar collector or collectors is greater than the heat load.

Many situations can cause a loss-of-load problem. A classic loss-of load solar-hot-water problem typically arises when a family goes on vacation in the summer without putting the solar system into vacation mode. With the storage tank at temperature, full of hot water, and no calls for hot water, the system can overheat because the solar collectors continue to add heat to the system which does not need it. Boiling and over-pressurization of the fluid in the solar collector usually follow, with accompanying damage to the system or to the fluid itself in the case of antifreeze solutions. This is an example of the loss-of-load problem.

Some solar thermal system designers opt to degrade the solar-hot-water-heating system performance to provide almost all of the hot water in summer and about half of the hot water needed in winter to avoid overheating in summer. They choose to under-size the system to avoid overheating on the hottest summer days when the solar collectors can be producing at their highest heat levels. If designers were to design a system with more solar collector area for more hot water in winter, the system could produce an over-supply of heat at times in the summer, thus potentially leading to boiling and over-pressurization of the fluid and accompanying damage as described above. This is an example of the over-supply problem.

Others have attempted to solve these problems in different ways. US Patent Number 20100059047 describes an automated over-temperature protection system that uses a pressure vessel near the outlet of the solar collector. Fluid is forced out of the solar collector and into a pressure vessel when the fluid in the solar collector boils. This protection system fails to prevent boiling before it starts. The allowed boiling can damage the system or fluid in the system.

U.S. Pat. No. 7,823,582 describes an automated solar collector temperature controller which opens dampers to the air space of the flat plat solar collector. This protection system works only for flat plate solar collectors, and compromises the thermal integrity of the solar collector with mechanical dampers which wear and eventually fail to close completely or properly.

U.S. Pat. No. 7,913,684 describes an automated protection system to remove vapor from a solar collector and indirectly cool it should fluid boiling occur in the solar collector in a pressurized solar thermal heating system. This system only addresses a loss of circulation, only works for a pressurized system, and by itself fails to prevent boiling. The patent adds dampers to the flat plate collector in the same fashion as the patent above. This damper system works only for flat plate solar collectors, and compromises the thermal integrity of the solar collector with mechanical dampers which wear and eventually fail to close completely or properly.

U.S. Pat. No. 4,102,325 describes an automated solar collector temperature control system which uses a thermosyphon, a valve and additional tubing integrated into the solar collector. This system is complex and expensive, and depends on small density differences in fluids to drive fluid flow and the cooling rate which can vary with the angle of piping and other factors, and hence can be unreliable.

Some solar thermal heating systems use heat dumps to shed excess heat. Typically, a heat dump can be a hot tub, a swimming pool, a slab of concrete with embedded hydronic tubing, a liquid-to-air heat dissipater, or other heat-dissipating device. Customary practice is to place a temperature-driven valve downstream of the outlet of the solar collectors, and to divert some or all of the flow through the heat dump. This method can overcool the fluid as there is no temperature feedback where the diverted flow returns to the system. This wastes energy, and can result in longer times to bring the storage tank up to temperature.

Some solar thermal heating systems use multiple sensors, electrically operated valves, electronic control systems, and heat dumps to limit fluid temperature. These systems are generally complex, expensive and difficult to service and to diagnose when troubles arise.

Some solar thermal heating systems use periodic heat dumping by hot water discharge to bring the temperature of storage tanks back down to within operating range. These systems risk allowing tank fluid temperatures to get too high, and waste water by discharging hot water down the drain and injecting cold water. Such systems are risky and wasteful of energy and water.

Solar thermal systems retrofit installations are infrequently done because of the expense and complexity of the installation. Much of the complexity and expense come from the lack of an available heat dump or the difficulty and expense of piping to a heat dump. When done, such retrofit installations typically are undersized to prevent problems such as boiling.

Use of renewable energy in solar thermal systems is hampered by the complexity and expense of installation and is underutilized by undersizing.

Thermostatically controlled valves, both mixing valves and diverting valves, have been used in industrial applications for many years for fluid temperature control. For example, they are used in diesel-engine-based electric generators to control coolant temperature to and from the engine and lubricating oil temperature to and from the engine. These valves typically combine coolant pumped from the engine with coolant from an external heat dump, usually outside the building housing the engine. These valve arrangements do not provide in-line cooling, and require an external source of cooling.

Mixing valves are used in boiler-type heating systems for various purposes, including reducing the fluid temperature from the boiler going into a hydronic radiant floor. This system uses the return from the radiant floor as the source of colder fluid. Such a cold return is not available in a solar thermal system and many other fluid systems.

Mixing valves are also used on domestic hot water systems to reduce the risk of scalding should the water heater produce water hot enough to burn the skin. This system uses the cold water source to reduce the water temperature. Such a cold source cannot be used in a solar thermal system and many other fluid systems because the systems are closed.

Oil coolers for engines sometimes have a diverter valve where oil exits the engine and then heads to a heat dissipater circuit or back into the engine. This valve sends oil back into the engine when the valve inlet temperature is below a set value, but diverts the flow into a heat dissipater circuit when the valve inlet temperature is above the set value, before returning to the engine. This system cools the oil when it becomes too hot, but does not control the amount of cooling as flow is simply directed into a heat dissipater without regard as to the fluid temperature exiting the heat dissipater. This can result in overcooling the engine, especially in very cold climates.

Hydraulic systems need to operate within a small range of viscosity for proper operation and to avoid cutting short component life. This translates into maintaining the appropriate fluid temperature as viscosity is temperature dependent. Current systems simply have the operator watch for anomalous operation or watch temperature sensor gauges. When an over-temperature issue arises and is detected, it is usually too late, with the result being that some hydraulic component malfunctions or fails. Current systems fail to prevent or mitigate the over-temperature condition.

Cutting oils work best when they are at or below a predetermined temperature. Current cooling systems for machines that use these oils fail to limit temperature or maintain a constant oil temperature.

In addition, current fluid systems without electronic controls don't adjust to changing conditions such as ambient temperature, heat transfer rate from the heat dissipater, flow rate change from pump degradation, flow path blockage, or fluid temperature change. Adding expensive electronic controls adds to the complexity of fluid systems and extra, unnecessary expense.

SUMMARY OF THE INVENTION

The problems described above are solved in a new way with the present invention. The present invention makes use of a thermostatic mixing valve in a completely new manner to achieve this innovation. No secondary fluid source is required.

The present invention is an automatic self-adjusting over-temperature protection apparatus and method for flowing fluid systems, both closed and open systems, in which fluid cooling is sometimes required or desired to keep the fluid temperature from exceeding a set limit above ambient at a point in the system. The present invention limits the temperature of the fluid and prevents the fluid temperature from exceeding a predetermined set temperature, by cooling the flow in a controlled manner when required, to bring the fluid temperature down to the predetermined set-point temperature. Thus, overcooling is prevented. When no cooling is needed, the fluid passes through the apparatus without temperature change.

The present invention, with appropriate temperature set-points and when installed upstream of a solar collector, can prevent boiling and the associated over-pressurization in the collector for both pressurized and unpressurized systems as long as flow continues. The present invention eliminates potential damage to the system from boiling in the collector. The loss-of-load and the over-supply problems are solved with the present invention.

The present invention does not require an external or additional or secondary fluid source. It uses a mixing valve in a completely new way so that the apparatus does not require two or more separate fluid sources. One fluid source suffices. The present invention cools the fluid passing through the apparatus without the requirement for a separate fluid source, and hence has much wider application than a system requiring two fluid sources.

The present invention can operate without electricity or any external power source which also gives it broader application. The present invention is simple and inexpensive, and will lead to greater penetration of solar thermal systems into the market.

The present invention can operate in any orientation which makes it better than thermosyphon devices, which cannot, and again gives the present invention broader application.

The present invention does not cause a loss of fluid as some systems do to reduce temperature. Only heat is removed, and no fluid is wasted down the drain.

Engine oil, hydraulic fluid, cutting oil and other fluids are returned to the engines, machines or devices in which they are used, at the optimum operating temperature to give better performance and longer life to all components.

The apparatus of the present invention is comprised of an inlet; an outlet; a flow splitter at the inlet; a mixing valve at the outlet; and two separate flow paths, a high-heat-dissipating path, and a normally insulated, low-heat-dissipating path, each path connected to the splitter and to the valve. The two paths are in parallel. Flow can be through one path or the other or both depending on the valve temperature response, in order to clip and maintain the fluid temperature when it is too high and to allow the fluid to pass unaltered in temperature when the fluid temperature is below a set-point temperature.

With the heat dissipater sized to dissipate heat at a rate that is greater than the maximum heat input rate from the rest of the flowing system beyond the apparatus and to provide a sufficient temperature decrease to actuate the mixing valve, the fluid temperature exiting the apparatus will be clipped or limited in over-temperature situations. System design thus becomes easier, because the present invention takes care of mismatches in the heat source and heat load. Solar thermal hot water heating systems can be designed to provide all of the hot water required year round, regardless of the changing solar heating rates during the year.

For liquid systems, if the orientation of the apparatus or the shape of the flow paths could lead to trapped air, gas, or vapor in the apparatus, air bleed valves can be included at high points to prevent flow blockages in the piping or tubing.

In any situation in which unidirectional flow through the apparatus is in question, one-way valves can be included.

A metal protective cover for the apparatus is included. The cover protects the apparatus from the environment and weather while still allowing ventilation. The cover also protects against skin burns from the hot high-heat-dissipating flow path.

When the high-heat-dissipating flow path has a higher pressure drop than the low-heat-dissipating flow path, a pump can be included in the apparatus.

As assurance that the high-heat-dissipating flow path rejects sufficient heat, a fan can be added that blows air across the heat dissipater of the apparatus.

The primary object of the present invention is to provide a simple, reliable apparatus and method for limiting the fluid temperature at a point in a flowing fluid system by cooling the fluid in a controlled manner with temperature feedback to also prevent overcooling.

Another object of the present invention is to provide a simple, reliable apparatus for preventing overheating or boiling in flowing systems by limiting the fluid temperature.

Another object of the present invention is to allow flowing system design and construction to provide greater utilization of solar thermal energy without the need for complex control systems. For example, non-drain-back-type residential solar hot water heating systems are typically sized to provide 100% of the load on clear, sunny, hot summer days but only 50% of the load in winter primarily because of overheating issues. (See "Solar Water Heating", by Bob Ramlow, p 133, New Society Publishers, 2006.) The present invention will allow for solar systems to be sized larger to provide higher percentages of the annual energy needs. Excess heat on clear, sunny, hot summer days is automatically be removed by the heat-dissipating path of the apparatus without the need for electrical control circuits or more complex electronic control systems.

Another object of the present invention is to provide a simpler, more reliable, less expensive means of accommodating the loss-of-load issue for non-drain-back-type solar hot water systems and solar space heating systems. When sized properly, the apparatus of the present invention provides adequate heat rejection without the need for external heat dumps, electrical control circuits or electronic control systems.

Another object of the present invention is to make solar hot water heating system retrofit installations easier. The apparatus of the present invention provides heat rejection without the need for an external heat dump, or for electrical control circuits or more complex electronic control systems. In addition, for non-drain-back-type systems, a separate heat dump does not have to be created inside or outside the house.

Another object of the present invention is to provide a simple inexpensive apparatus for insertion into existing solar thermal systems to eliminate the risk of fluid boiling and damage in normal flow situations. Some existing solar thermal systems might not have experienced boiling yet because the home owners have not yet forgotten to put the system into vacation mode when they leave, or because the summers were not quite hot enough to drive the system into the boiling range. With global warming, some existing systems might soon make it into that range. Insertion of the present invention into the system would preclude such overheating problems.

Another object of the present invention is to provide a means for limiting the temperature of the fluid in a storage tank without wasting fluid or energy.

Another object of the present invention is to provide a simple, reliable fluid temperature limiter for hydraulic systems, for engine oil systems, for engine coolant systems, for cutting oil circulating systems, and for transmission oil systems.

These and other objects of the present invention, will become apparent to those skilled in this art upon reading the accompanying description, drawings, and claims set forth herein.

The present invention is simple, inexpensive, and extremely reliable with almost no moving parts, can operate in any orientation, requires no electricity, requires no electronic sensors or electronic control circuitry, and can be used in many flowing fluid applications.

The present invention, with its cost savings, design simplicity, and ease of installation, will revolutionize solar thermal water heating and space heating, and pave the way for greater renewable energy utilization.

Figure 1:
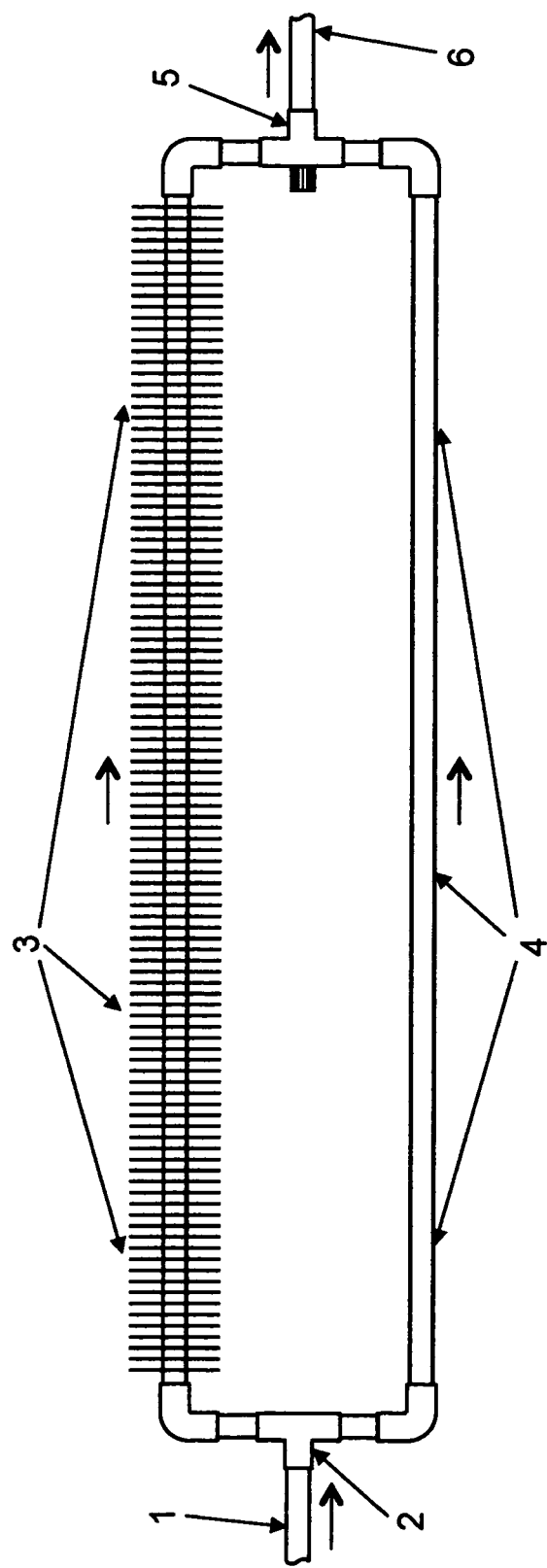
FIG. 1 on Sheet 1 shows an embodiment of the present invention in its best mode, shown without insulation for clarity.

Sheet 4 shows a more complex embodiment of the present invention that includes a high-heat-dissipating flow path that is longer than the low-heat-dissipating flow path, a thermostatically controlled pump, and a thermostatically controlled fan. The apparatus is shown without insulation for clarity.

Sheet 5 shows a best-mode solar thermal application of the present invention inside the house that limits the fluid temperature exiting the apparatus to prevent boiling in the downstream solar collector and to prevent overcooling of the fluid entering the solar collector. The apparatus and piping are shown without insulation for clarity.

Sheet 6 shows the same application of the present invention as on Sheet 5, but with the apparatus outside the house. The apparatus and piping are shown without insulation for clarity.

Sheet 7 shows an application of the present invention integrated into a flat plate solar collector. Piping and portions of the apparatus outside the solar collector are shown without insulation for clarity.

Sheet 8 shows an application of the present invention that is used to limit and maintain the upper-cutoff temperature of the fluid inside a storage tank. The apparatus and piping are shown without insulation for clarity.

DETAILED DESCRIPTION OF THE INVENTION

1. Definitions

Mixing valve. A mixing valve is a thermostatically controlled valve that mixes or modulates inlet fluid streams, one hot and one cold, to adjust the temperature of an outlet fluid stream to a preset temperature range. Mixing valves are also known as blending valves and tempering valves.

Some more recent mixing valves for domestic hot water applications include a feature that shuts off the fluid flow through the valve completely if the outlet temperature cannot be limited, usually due to inlet cold fluid temperature or pressure issues. The mixing valves in the present invention do not include this feature, and always allow flow regardless of outlet fluid temperature.

Mixing valves can be mechanical or electromechanical. Mechanical mixing valves use the temperature-dependent expansion and contraction properties of special materials, such as phase-changing wax, bimetallic components, or certain fluids, and require no electricity or external power. Electromechanical mixing valves use powered valves and can use separate temperature sensors.

2. Basic Embodiment of the Present Invention

The apparatus of the present invention (basic embodiment in FIG. 1 on Sheet 1) is comprised of a fluid inlet (1); a fluid outlet (6); a flow splitter (2) at the inlet; a mixing valve (5) at the outlet; and two separate flow paths, a high-heat-dissipating path (3), and a low-heat-dissipating path (4) (shown without insulation for clarity), each path connected to the splitter and to the valve. The two paths are in parallel. Flow can be through one path or the other or both depending on the mixing valve temperature response, in order to clip and maintain the fluid temperature when it is too high and to allow the fluid to pass unaltered in temperature when the fluid temperature is low. Flow is in one direction through the apparatus, from inlet to outlet. Arrows show the direction of fluid flow.

The fluid enters the device through the inlet (1), flows into the flow splitter (2) and then flows into one of two paths or both (3 & 4), according to the mixing valve (5) position near the outlet (6).

The high-heat-dissipating flow path (3) in FIG. 1 on Sheet 1 is shown as a finned pipe radiator component, but can be any type of heat-dissipater that rejects heat directly or indirectly to the ambient environment, including but not limited to such heat dissipaters as: an automobile-type radiator, a radiator for space heating in a house, a refrigerator cooling coil, a bare pipe or tube, piping or tubing in a liquid bath, and piping or tubing passing liquid sprayers.

Figure 2:
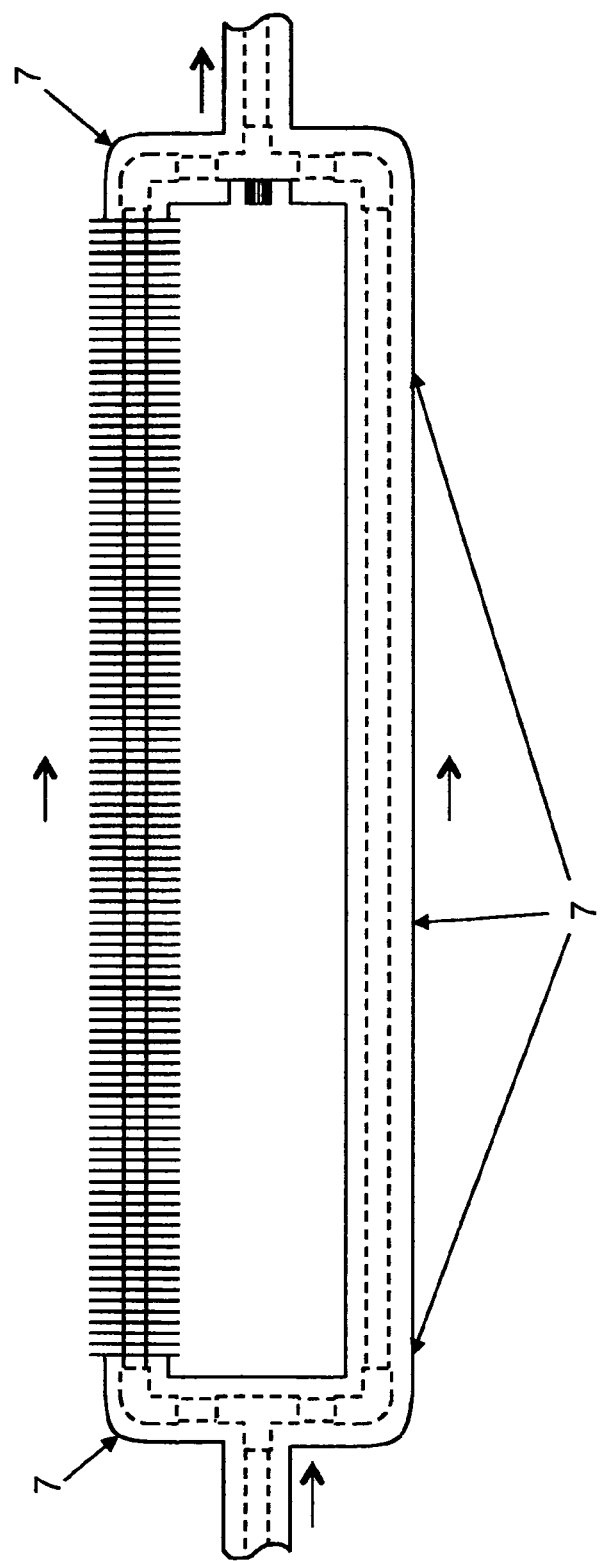
FIG. 2 on Sheet 2 shows the same embodiment as FIG. 1 on Sheet 1, but also shows the insulation, with the piping inside the insulation shown as dashed lines.

FIG. 2 on Sheet 2 shows the same embodiment as FIG. 1 on Sheet 1, but includes insulation (7) where it is placed in the best mode, and shows the underlying components as dashed lines. Arrows show the direction of fluid flow.

Figure 3:
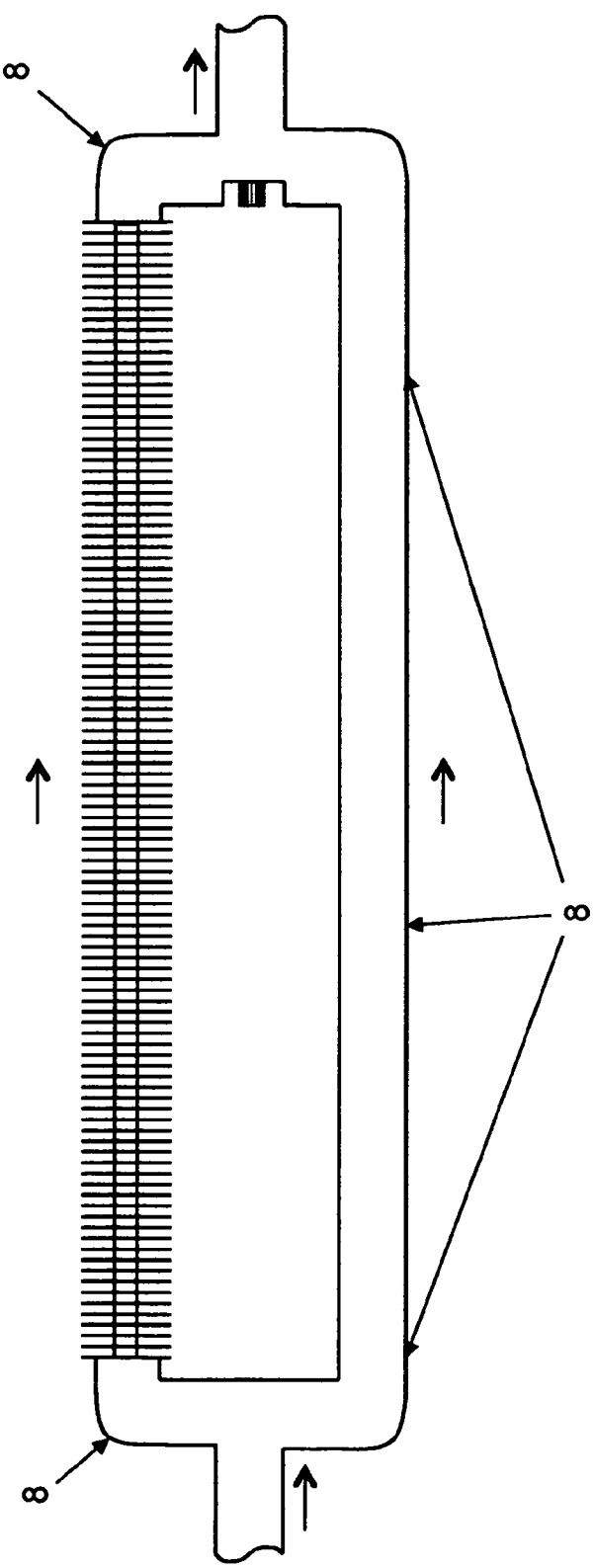
FIG. 3 on Sheet 3 shows the same embodiment as FIG. 1 on Sheet 1 and FIG. 2 on Sheet 2, but shows the insulation as it would appear to the eye.
Figure 4:
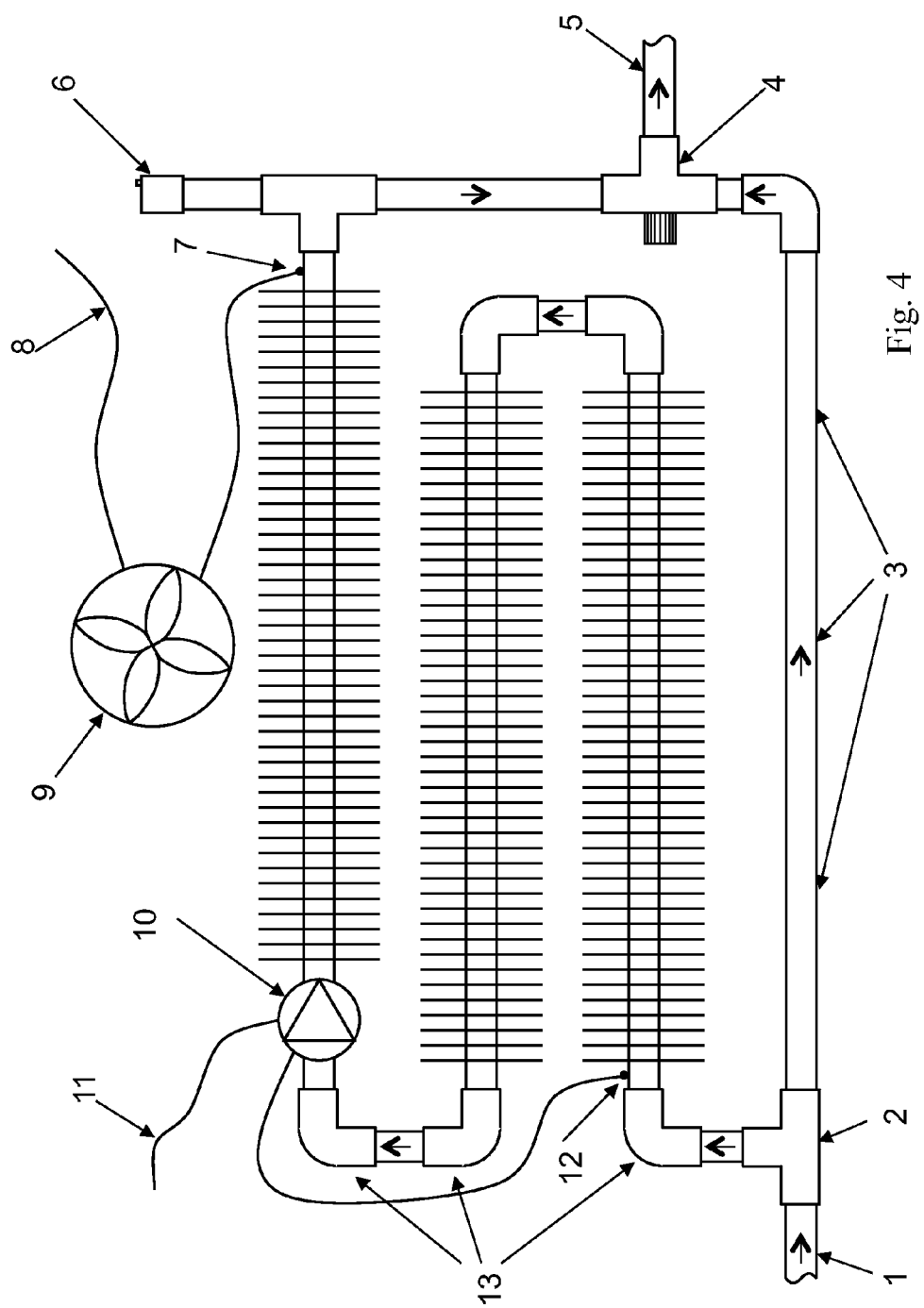
Figure 5:
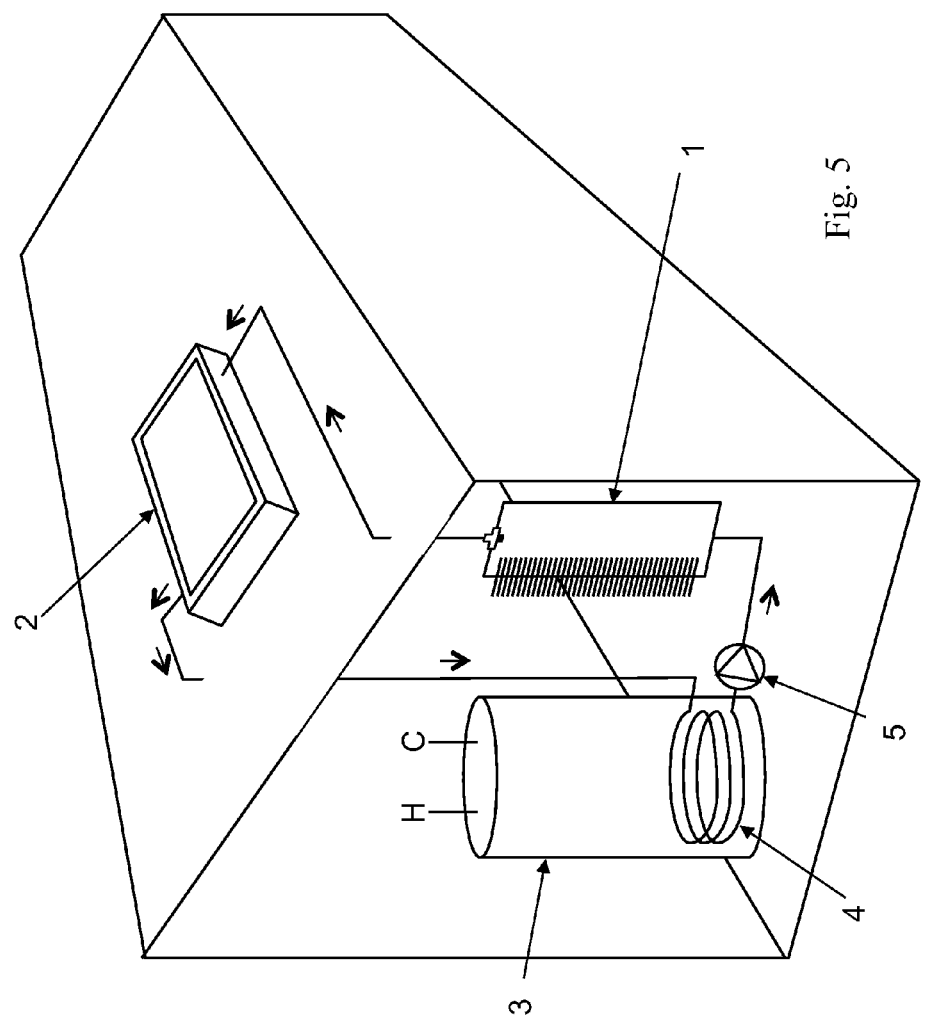
Figure 6:
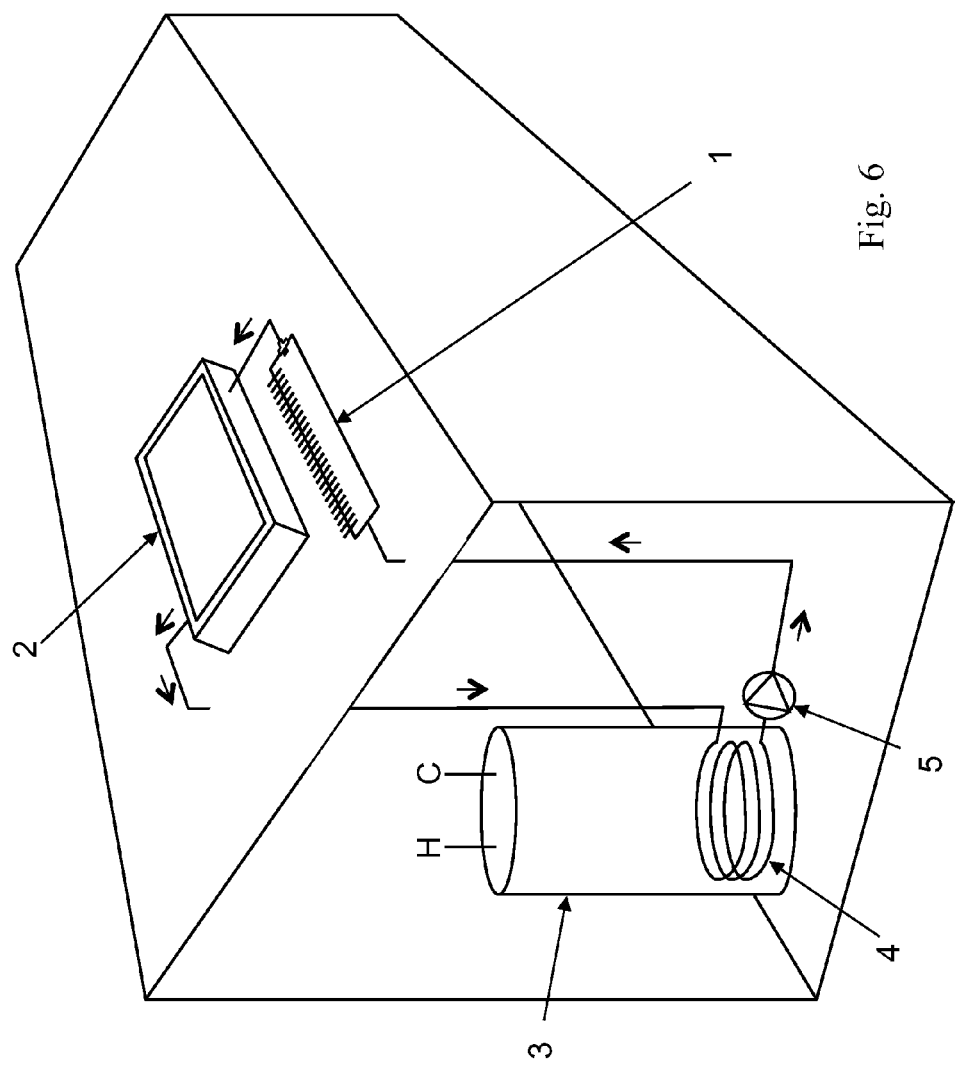
Figure 7:
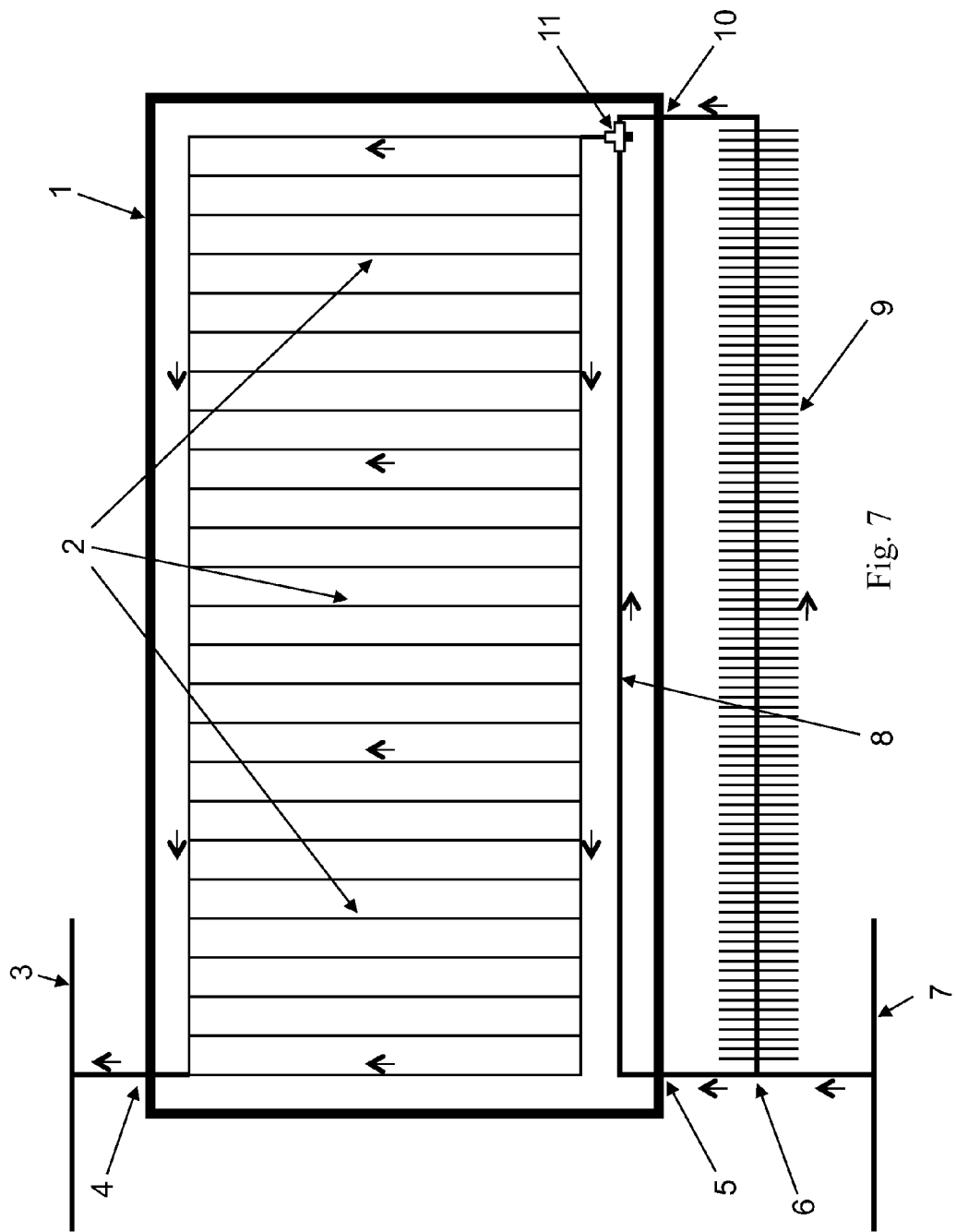
Figure 8:
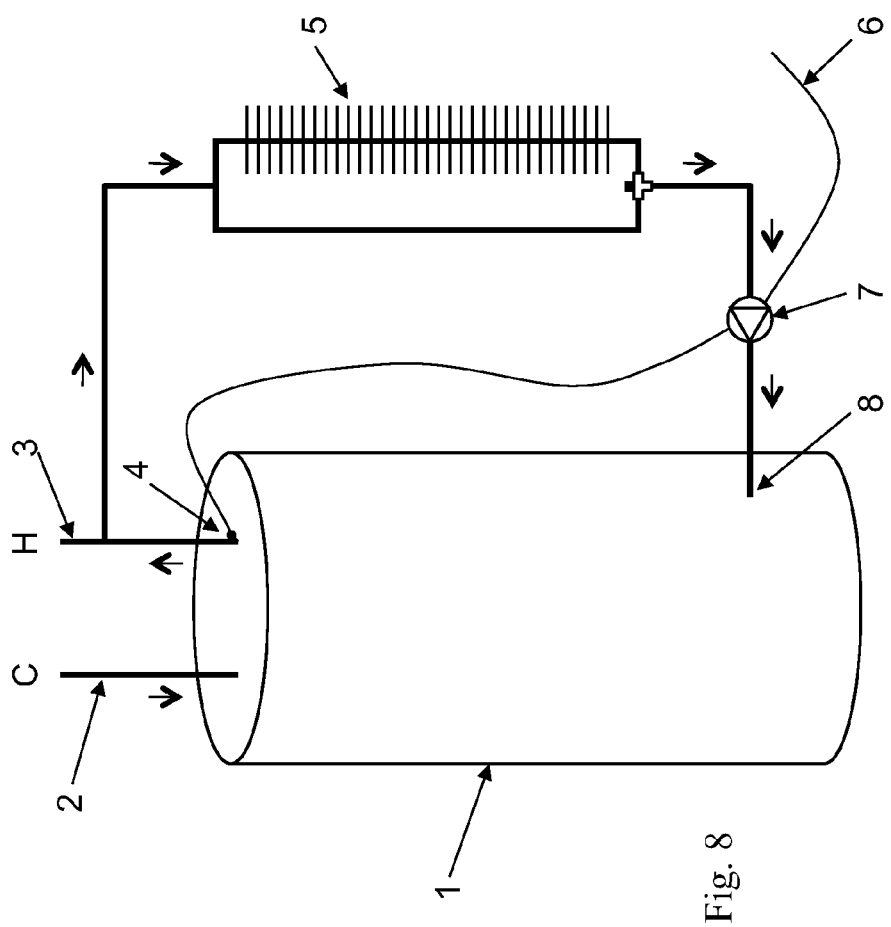

FIG. 3 on Sheet 3 shows the same embodiment as FIG. 1 on Sheet 1 and FIG. 2 on Sheet 2, with insulation (8) and other components as they would appear to the eye. Arrows show the direction of fluid flow. For clarity, FIGS. 1, 2 & 3 on Sheets 1, 2 & 3 do not show a protective cover for the apparatus. The cover is sheet metal or other such material perforated with holes for ventilation, and protects from the sun, from weather, and against skin burns.

The mixing valve (5) has two temperature set-points, a lower temperature set-point and a higher, upper temperature set-point, both chosen for the specific application. These set-points can be tens of degrees apart or less than one degree apart, depending on the application and requirements. The mixing valve can have preset temperature set-points, or can have adjustable temperature set-points. The mixing valve (5) shown in FIG. 1 on Sheet 1 has an adjustment knob. Some adjustable mixing valves have a fixed difference between the upper and lower set-points, and allow the upper set-point to be changed on the mixing valve body.

When the temperature of the fluid exiting the apparatus is below the lower set-point temperature, the mixing valve responds so that no, or almost no, flow is through the high-heat-dissipating flow path, and all, or almost all, of the flow (admitting some possible small mixing valve leakage) is through the low-heat-dissipating path.

When the temperature of the fluid exiting the apparatus is above the upper set-point temperature, the mixing valve responds so that no, or almost no, flow is through the low-heat-dissipating flow path, and all, or almost all, of the flow (admitting some possible small mixing valve leakage) is through the high-heat-dissipating path.

When the temperature of the fluid exiting the mixing valve is between the apparatus lower set-point temperature and the apparatus upper set-point temperature, the mixing valve responds so that some of the flow goes to both paths. As the fluid temperature increases from the lower to the upper set-point temperature, fluid flow through the high-heat-dissipating path goes from 0% to 100%, while fluid flow through the low-heat-dissipating path goes correspondingly from 100% to 0%.

As the temperature of the fluid at the mixing valve (5) changes in time, the mixing valve position adjusts automatically to give the proper mix. Thus, the apparatus of the present invention is automatic and self-adjusting. This is especially useful when the flow rate through the system changes, as when pumps degrade in time and the flow rate decreases. The apparatus adjusts, and the temperature response of the apparatus stays the same. In a fluid over-temperature condition, the outlet temperature will remain within the lower and upper set-point temperatures.

With the heat dissipater on the high-heat-dissipating path (3) sized to dissipate heat at a rate that is greater than or equal to the maximum heat input rate in the rest of the flowing fluid system beyond the apparatus and to provide a sufficient temperature decrease to actuate the mixing valve, the fluid temperature exiting the apparatus will be clipped and maintained between the lower and upper set-point temperature in over-temperature situations.

This allows the apparatus to be oversized, yet achieve the same fluid outlet temperature. The apparatus self-adjusts by simply putting less flow through the high-heat-dissipating flow path. Solar thermal system designers and other designers do not need to be exact in matching the size of the apparatus with the system, and can simply ensure that the apparatus for the system being designed is sized to match or exceed the maximum heat input rate. There is no performance penalty for over-sizing the apparatus and very little additional cost.

The temperature set-points are chosen with respect to the operating pressure of the system of which the present invention is a part. For example, at atmospheric pressure, a typical 50/50 mixture of propylene glycol antifreeze and water will boil at about 220 degrees Fahrenheit. Calculations or testing might show that the maximum fluid temperature increase from one pass through the solar collectors at high fluid temperatures to be about 10 degrees Fahrenheit. This calls for setting the upper temperature set-point at 210 degrees Fahrenheit or lower to preclude boiling in the solar collectors. To provide a safety margin, the design upper temperature set-point might be set even lower, at say 205 degrees Fahrenheit.

At about 2 atmospheres of pressure, the boiling point for the same mixture is about 265 degrees Fahrenheit. Calculations or testing might show that the maximum fluid temperature increase from one pass through the solar collectors at high fluid temperatures to be about 15 degrees Fahrenheit. This calls for setting the upper temperature set-point at 250 degrees Fahrenheit or lower to preclude boiling in the solar collectors. To provide a safety margin, the design upper temperature set-point might be set even lower, at say 245 degrees Fahrenheit.

In an application for oil cooling for an engine or an application for hydraulic fluid cooling for machinery or an engine transmission, the upper and lower temperature set-points are set for the optimum temperature range for fluid viscosity. In an application for cutting oil, the upper set-point is set at the oil temperature for optimum cutting, and the lower set-point temperature is set as close to that temperature as possible.

FIGS. 1-3 show a basic embodiment of the present invention. It can be designed and installed in a new system. It can also be added simply and inexpensively to an existing system by identifying where in the system a limiting temperature is desired, removing a short length of piping at that point, and inserting the apparatus of the present invention. Thus, existing flowing fluid systems can be easily safeguarded retroactively against over-temperature conditions with the insertion of an apparatus of the present invention.

3. More Complex Embodiment of the Present Invention

Sheet 4 shows a more complex embodiment of the present invention, an embodiment in which the high-heat-dissipating flow path (13) is about 3 times longer and more tortuous than the low-heat-dissipating flow path (3) (shown without insulation for clarity). Arrows show the direction of fluid flow. The higher pressure drop on the high-heat-dissipating path is overcome with an added thermostatically controlled pump (10). To increase heat rejection, a thermostatically controlled fan (9) is added. To avoid flow blockages due to trapped air, gas or vapor, an automatic air bleed valve (6) is included. The apparatus is shown without a protective cover for clarity.

Fluid enters at the inlet (1), travels to the splitter (2), then travels along one of the two flow paths, (3) or (13), or both (3 & 13), then enters the mixing valve (4) and then exits at the outlet (5). The temperature sensor (7) for the thermostatically controlled fan (9) will only activate when hot fluid is flowing through the high-heat-dissipating flow path. The fan power cord is shown at (8). Likewise, the temperature sensor (12) for the electric pump (10) will only activate when hot fluid is flowing through the high-heat-dissipating flow path. The pump power cord is shown at (11).

4. How to Make the Invention

First, the point in the flowing fluid system where a temperature limit is required or desired is identified, along with the type of piping connections required at that point. The lower and upper set-point temperatures are determined for the application. A mixing valve is selected with these set-points and the proper piping connections. The maximum heat input rate for the system is calculated or derived from testing. The heat dissipater for the high-heat-dissipating flow path is chosen and sized with a heat rejection rate under extreme, most stressing conditions that exceeds the maximum system heat input rate. The heat dissipater is sized even larger, if necessary, to produce the minimum temperature decrease or more through the heat dissipater needed to actuate the mixing valve. In practice, apparatuses can be pre-made with heat dissipaters matched to the mixing valve temperature requirements, so a designer need only ensure that the heat rejection rate is sufficient.

The pressure drop for working fluid passage through the heat dissipater is determined. As long as the pumps in the system are capable of overcoming this pressure drop, and the other pressure drops in the system, the piping for the low-heat-dissipating flow path is chosen to give the same pressure drop. Thus, flow rate through the apparatus will be the same regardless of which flow path is being utilized during operation.

A flow splitter for the inlet side is selected, usually a tee, for compatibility with the piping connections. The mixing valve is joined to the heat dissipater component and to the piping for the low-heat-dissipating flow path with compatible piping connectors, as shown in FIG. 1 on Sheet 1. In a similar fashion, the flow splitter is joined to the other ends of the heat dissipater component and the piping for the low-heat-dissipating flow path with compatible piping connectors, as shown in FIG. 1 on Sheet 1. Insulation is applied to all but the heat dissipater and the mixing valve body. A breathable sheet metal cover is attached to surround the entire apparatus or just the heat dissipater.

The completed apparatus is delivered, and installed in the identified position and connected in-line with the system piping, with the flow splitter at the inlet and the mixing valve at the outlet as shown in FIG. 1 on Sheet 1.

5. Application to Solar Thermal System

Sheet 5 shows an inside-the-house application of the present invention on a simplified non-drain-back type solar thermal system for domestic hot water heating. Being the component before the solar collector, that is, upstream of the solar collector, with no other temperature-altering system component between, makes this a best mode for this application of the present invention. Arrows show the direction of fluid flow. The flat plate solar collector (2) is mounted on the roof. The working fluid exits the solar collector (2) and travels to a heat exchanger (4) inside the hot water tank (3) where heat is transferred to the water. The working fluid then travels to the pump (5) and then to the apparatus (1) of the present invention, then back to the solar collector (2). If the temperature of the fluid is above the upper set-point temperature, the apparatus decreases the temperature back down to between the lower and upper temperature set-points as it exits the apparatus, and before it enters the solar collector. This upper temperature set-point is chosen so that the solar collector cannot add enough heat to the fluid during a single pass through the solar collector to bring the working fluid to a boil. The lower temperature set-point is set as close to the upper set-point as possible. The splitter is at the bottom of the apparatus (1) and the mixing valve is at the top in Sheet 5. The apparatus is shown without a protective cover for clarity. When there is sufficient space inside the house for the apparatus, this apparatus can be: included in the solar thermal system design and installation for a new house, or included in a retrofit solar thermal system installation for an existing house, or added to an existing solar thermal system in an existing house.

Sheet 6 shows an outside-the-house application of the present invention on a simplified non-drain-back type solar thermal system for domestic hot water. Arrows show the direction of fluid flow. The only difference between Sheet 5 and Sheet 6 is that the apparatus of the present invention is outside on the roof but still before the inlet to the solar collector. Being the component before the solar collector, that is, upstream of the solar collector, with no other temperature-altering system component between, makes this a best mode for this application of the present invention. The flat plate solar collector (2) is mounted on the roof. The working fluid exits the solar collector (2) and travels to a heat exchanger (4) inside the hot water tank (3) where heat is transferred to the water. The working fluid then travels to the pump (5) and then to the apparatus (1) of the present invention, then back to the solar collector (2). If the temperature of the fluid is above the upper set-point temperature, the apparatus decreases the temperature back down to between the lower and upper temperature set-points as it exits the apparatus, and before it enters the solar collector. This upper temperature set-point is chosen so that the solar collector cannot add enough heat to the fluid during a single pass through the solar collector to bring the working fluid to a boil when the fluid temperature is at the upper set-point temperature. The lower temperature set-point is set as close to the upper set-point as possible. The apparatus' splitter is to the left in Sheet 6, and the apparatus' mixing valve is to the right in Sheet 6. The apparatus is shown without a protective cover for clarity. When there is sufficient space outside the house for the apparatus, this apparatus can be: included in the solar thermal system design and installation for a new house, or included in a retrofit solar thermal system installation for an existing house, or added to an existing solar thermal system in an existing house.

6. Application to Solar Collector

Sheet 7 shows an application of the current invention, a flat plate solar collector with the apparatus of the present invention integrated into the solar collector. (1) is the body of the solar collector. (2) is the vertical channels in the flat plate where the fluid picks up the heat from the sun. (3) is the outlet header that connects to other solar collectors' outlets and to the return from the solar collectors. (4) is the outlet from the solar collector that feeds into the header (3). (5) and (10) are the two inlets to the solar collector. Essentially, half the apparatus of the present invention is inside the solar collector, and half outside, and these two inlets are the dividing points. (6) is the splitter for the apparatus. (7) is the inlet header that connects to other solar collectors' inlets and to the supply to the solar collectors. (8) is the low-heat-dissipating flow path which does not need to be separately insulated as it is inside the insulated flat plate solar collector housing. (9) is the high heat dissipating flow path which is outside the solar collector. It is shown without a protective cover for clarity. The cover protects the path from the weather and the sun while still allowing air flow. Alternatively, the high-heat-dissipating flow path could be positioned in back of the solar collector for additional shading from the sun. (11) is the mixing valve for the apparatus. A mechanical pass-through device could be added if desired to allow turning the adjustment knob on an adjustable mixing valve from outside the solar collector. Arrows show the direction of fluid flow.

When the fluid temperature is below the lower temperature set-point, fluid enters the solar collector at (5) and travels along the low-heat-dissipating path (8) to the mixing valve (11). When the fluid temperature is above the upper temperature set-point, fluid enters the solar collector at (10) having traveled along the high-heat-dissipating path (9). When the fluid temperature is between the lower and upper temperature set-points, fluid travels through both paths (8 & 9). The upper temperature set-point is chosen and set so that even with the flowing fluid picking up the maximum amount of heat while flowing through the solar collector, the fluid temperature will not reach the boiling point in the solar collector. The lower temperature set-point is chosen as close to the upper temperature set-point as possible.

7. Application to Storage Tank

Sheet 8 shows an application of the current invention to a hot water storage tank. Some storage tanks, including hot water tanks driven by solar heating, need to be kept below a cutoff temperature. Preventing boiling and preventing scalding are two common reasons for such a cutoff temperature. If the tank can exceed that cutoff temperature, as it can at times when heated by a solar thermal system, then some means of bringing the temperature back down and keeping it below the cutoff are needed. This application of the present invention does this, and avoids wasting water and overcooling the tank.

In Sheet 8, (1) is the hot water storage tank, (2) is the cold water supply inlet to the tank, (3) is the hot water outlet from the tank, and (8) is the drain valve opening at the bottom of the tank. Arrows show the direction of water flow. The apparatus of the present invention is attached to the tank at the top and bottom. When the water temperature exceeds the cutoff temperature at the temperature sensor (4), the thermostatically controlled pump (7) turns on and moves water from the hot water outlet (3) to the drain valve opening (8). (6) is the electrical power plug for the pump. Between (3) and (8), the water passes through an apparatus of the present invention (5). In Sheet 8, the splitter is at the top, and the mixing valve is at the bottom of the apparatus. The upper temperature set-point of the apparatus is set at the cutoff temperature, and the lower temperature set-point of the apparatus is set as close to the upper as possible. The water returning to the tank is at, or slightly below, the cutoff temperature, not at the cold water temperature, so much less energy is wasted. Further, no water is wasted down the drain. Though this application is for a water storage tank, it works for any type of fluid storage tank.

8. Other Applications

The present invention has application to other areas where fluid temperature control is required or desired, including but not limited to, fluid systems for engine oil, engine coolant, transmission oil, cutting oil, and hydraulic fluid.

9. Best Modes

The best mode of the present invention is the design and construction of the apparatus in which: the apparatus' upper set-point temperature is set to the desired or required temperature limit; the apparatus' lower set-point temperature is chosen and set appropriate for the application; the high-heat-dissipating flow path is sized to reject heat at a rate that exceeds the highest anticipated heat load from the balance of the system beyond the apparatus when the fluid temperature is at the upper temperature set-point for the apparatus and to provide a sufficient temperature decrease to actuate the mixing valve; the pressure drop for high-heat-dissipating flow path is the same as for the low-heat-dissipating flow path; the pressure drop for each path is minimized; no electricity or external power is required; and the protective cover is in place. This mode has the highest reliability because of its simplicity. Keeping the pressure drops for the flow paths low and equal eliminates the need for additional pumps and associated external power.

The best mode for the application of the present invention in a solar thermal system to prevent boiling in the solar collectors is the design and construction of the solar thermal system in which: the apparatus is placed before the inlet to the solar collector to regulate the temperature of the fluid entering the inlet to the solar collector, with no other temperature-altering system component between the apparatus and the solar collector; the upper set-point temperature for the apparatus is set so that in a single pass through the solar collectors at high fluid temperatures the heat added to the fluid in the solar collector cannot bring the fluid temperature to the boiling point at the operating pressure of the system; the lower set-point temperature for the apparatus is set as close as possible to the upper set-point temperature; the apparatus is designed and built with the high-heat-dissipating flow path sized to reject heat at a rate that exceeds the highest anticipated heat load when the fluid temperature is at the upper temperature set-point for the apparatus and to provide a sufficient temperature decrease to actuate the mixing valve; the apparatus is designed and built with the pressure drop for high-heat-dissipating flow path the same as for the low-heat-dissipating flow path; the apparatus is designed and built with the pressure drop for each path minimized; the apparatus is designed and built to require no electric power; and the protective cover is in place. This mode is the most effective for preventing boiling in the solar collector, and has the highest reliability because of its simplicity. Apparatus placement downstream of the solar collector is disadvantageous. Fluid exiting the solar collector near the boiling point does not need to be cooled because higher temperatures deliver heat to where its needed faster and more efficiently, to, for example, the hydronic piping in a concrete slab floor or the heat exchanger in a hot water storage tank. An apparatus of the present invention installed downstream of the solar collector make for a less efficient system that takes longer to bring up to temperature. The best mode is upstream of the solar collector.

Other applications have a best mode, also, which includes optimum placement of the apparatus of the present invention between the components of the fluid system, the choice of temperature set-points, low and balanced pressure drops, and no electrical power requirements.

For engine applications, the best mode is placement just before the oil or coolant reenters the engine. This allows for the fluid to be maintained and used in the engine at the optimum temperature (and viscosity) for optimum fluid performance inside the engine. The same applies for transmission oil applications. In addition, the best mode includes selection of the upper and lower temperature set-points that keep the fluid viscosity in the optimum range.

For hydraulic applications, the best mode is after the pump and before fluid branching and distribution to the valves and pistons which require a small range of viscosity, and hence temperature, as viscosity is temperature dependent. So, the actuators, valves, and pistons, will have the proper temperature hydraulic fluid for optimum operation and long service life. In addition, the best mode includes selection of the upper and lower temperature set-points that keep the viscosity in the optimum range.

For storage tank temperature limiter applications, the best mode is to take the overheated fluid from the top or outlet of the tank and return fluid at, or very close to, the cutoff temperature, to the bottom of the tank. Between are the apparatus and the pump. The upper temperature set-point is set at the tank cutoff temperature, and the lower temperature set-point is set as close to the upper as possible.

For cutting oil system applications, the best mode is to move just used and possibly overheated oil from the catch basin reservoir and move it through an embodiment of the present invention with the upper and lower set-point temperatures set for the optimum temperature for the cutting oil and the application.

For the highest reliability and simplicity, balanced and minimized pressure drops and no power requirements complete the best mode description.

It will be appreciated by those skilled in the art that the present invention is not restricted to the particular embodiments and applications described with reference to the drawings, and that variations can be made therein without departing from the scope of the present invention as defined in the appended claims and equivalents thereof.

What is claimed is:

1. An automatic self-adjusting, self-powered, over-temperature protection apparatus for limiting fluid temperature on a single flow path in flowing fluid systems, comprising: a flow splitter at the inlet that allows inlet fluid to the apparatus to travel to the start of two flow paths through the apparatus; a mixing valve near the outlet that opens and closes in response to the fluid temperature at the mixing valve outlet, combines fluid from the flow paths and directs the flow to the outlet of the apparatus; a low-heat-dissipating flow path, connected to the flow splitter and to the mixing valve that has 0% or almost 0% of the flow through the apparatus when the temperature at the mixing valve outlet is above an upper set-point temperature, 100% or almost 100% of the flow through the apparatus when the temperature at the mixing valve outlet is below a lower set-point temperature, and a percentage between 0% and 100% of the flow through the apparatus when the fluid temperature at the mixing valve outlet is between the lower and upper set-point temperatures; and a high-heat-dissipating flow path, connected to the flow splitter and to the mixing valve in parallel with the low-heat-dissipating flow path, that has 0% or almost 0% of the flow through the apparatus when the temperature at the mixing valve outlet is below a lower set-point temperature, 100% or almost 100% of the flow through the apparatus when the temperature at the mixing valve outlet is above an upper set-point temperature, and a percentage between 100% and 0% of the flow through the apparatus, the balance of flow through the low-heat-dissipating flow path, when the fluid temperature at the mixing valve outlet is between the lower and upper set-point temperatures.

2. An apparatus according to claim 1, wherein said apparatus' flow splitter comprising a manifold, tee, "Y", or other type of piping or tubing connector for dividing flow into a plurality of flow paths.

3. An apparatus according to claim 1, wherein said apparatus' mixing valve is self-powered, requires no external power, and directs all flow through the low-heat-dissipating flow path when the temperature at the mixing valve outlet is below the valve's lower set-point temperature, all flow through the high-heat-dissipating flow path when the temperature at the mixing valve outlet is above the valve's upper set-point temperature, and splits the flow between the flow paths when the temperature at the mixing valve outlet is between the lower and upper set-point temperatures, whereby the fluid temperature is kept below a limit temperature.

4. An apparatus according to claim 1, wherein said apparatus' low-heat-dissipating flow path comprises piping or tubing with a lower heat rejection rate compared to the high-heat-dissipating path.

5. An apparatus according to claim 1, wherein said apparatus' high-heat-dissipating flow path comprises at least one passive cooling device that dissipates heat to the ambient environment.

6. A high-heat-dissipating flow path according to claim 5, wherein said flow path comprises at least one pump to decrease pressure drops along the high-heat-dissipating flow path.

7. An apparatus according to claim 1, wherein said apparatus includes a means, in liquid systems, for releasing trapped air, gas or vapor in the fluid flow, that might impede flow or create noise, with a manual or automatic device, such as a float-type bleed valve.

8. An apparatus according to claim 1, wherein said apparatus includes a means for maintaining unidirectional flow through the apparatus.

9. An apparatus according to claim 1, wherein said apparatus includes a protective cover over the high-heat-dissipating flow path that provides shade, ventilation, protection from the weather, and protection against skin burns.

10. A solar thermal heating system apparatus according to claim 1 comprising: an automatic self-adjusting over-temperature protection apparatus of the present invention; one or more solar collectors; at least one heat storage component; at least one pump; a working fluid; associated piping for connecting the heat storage components to the pump; at least one sensor; and electronic circuits to connect the sensor to a display to give readouts of the solar heating system apparatus.

11. A flat-plate solar collector apparatus according to claim 1 comprising: an automatic self-adjusting over-temperature protection apparatus of the present invention integrated into the insulated collector body; an interior metal plate for collecting solar heat; a glazing for admitting solar radiation; interior piping to move a working fluid through a collector; a fluid inlet; and a fluid outlet.

12. A fluid storage tank system apparatus according to claim 1 comprising: an automatic self-adjusting over-temperature protection apparatus of the present invention; a fluid storage tank; a thermostatically controlled pump; a working fluid; and associated piping for connecting the heat storage components to the pump.

13. An automatic self-adjusting, self-powered, over-temperature protection method for limiting fluid temperature on a single flow path in flowing fluid systems, comprising the steps of: admitting flowing fluid into a flow splitter; channeling the fluid into the passive low-heat-dissipating flow path when the fluid temperature at the self-powered mixing valve outlet is below the lower set-point temperature, channeling the fluid into the passive high-heat-dissipating flow path when the temperature at the self-powered mixing valve outlet is above the upper set-point temperature; dividing the fluid between the flow paths when the fluid temperature at the self-powered mixing valve outlet is between the lower and upper set-point temperatures; minimizing heat dissipation along the passive low-heat-dissipating flow path through the device; providing adequate heat dissipation to the ambient environment along the passive high-heat-dissipating flow path through the device; and recombining flow at the self-powered mixing valve outlet.

* * * * *